United States Patent
Uryu et al.

(10) Patent No.: US 9,862,409 B2
(45) Date of Patent: Jan. 9, 2018

(54) ELECTRIC POWER STEERING APPARATUS

(71) Applicant: NSK LTD., Tokyo (JP)

(72) Inventors: Kyosho Uryu, Tokyo (JP); Shin Kumagai, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/890,045

(22) PCT Filed: Sep. 17, 2014

(86) PCT No.: PCT/JP2014/074483
§ 371 (c)(1),
(2) Date: Nov. 9, 2015

(87) PCT Pub. No.: WO2016/042608
PCT Pub. Date: Mar. 24, 2016

(65) Prior Publication Data
US 2017/0183029 A1    Jun. 29, 2017

(51) Int. Cl.
*H02P 1/04* (2006.01)
*H02P 3/00* (2006.01)
(Continued)

(52) U.S. Cl.
CPC ......... *B62D 5/0487* (2013.01); *B62D 5/0463* (2013.01); *B62D 5/0484* (2013.01);
(Continued)

(58) Field of Classification Search
CPC ....... H02M 2001/0009; H02M 7/5395; H02M 1/32; H02M 1/38; H02M 7/53875;
(Continued)

(56) References Cited

U.S. PATENT DOCUMENTS 4,772,996 A * 9/1988 Hanei ............... H02M 7/53873
318/811
7,148,651 B2 * 12/2006 Tobari .................... H02P 6/085
318/700
(Continued)

FOREIGN PATENT DOCUMENTS

DE     102012107084 A1    2/2013
EP         2169411 A1      3/2010
(Continued)

OTHER PUBLICATIONS

Written Opinion for PCT/JP2014/074483 dated Dec. 16, 2014.
Communication dated Jun. 14, 2017 from the European Patent Office in counterpart European application No. 14897890.1.

*Primary Examiner* — Paul Ip
(74) *Attorney, Agent, or Firm* — Sughrue Mion, PLLC

(57) ABSTRACT

[Problem]
An object of the present invention is to provide an electric power steering apparatus that has a 3-shunt control function to perform a 3-shunt PWM-control for raising a reliability of the apparatus and for improving a stability, and a 1-shunt control function to perform a 1-shunt PWM-control so as to continue an assist control when the 3-shunt control function is damaged.
[Means for solving the problem]
The electric power steering apparatus according to the present invention, having: a 3-shunt control function to perform a 3-shunt PWM-control with a first 3-phase detected current values based on down-stream 3-shunt; a 1-shunt control function to perform a 1-shunt PWM-control with a second 3-phase detected current values based on down-stream 1-shunt; and a switching function to switch from the 3-shunt control function to the 1-shunt function when a failure of current detection circuit system in relation to the first 3-phase detected current values is detected.

6 Claims, 6 Drawing Sheets

(51) Int. Cl.
*H02P 27/06* (2006.01)
*B62D 5/04* (2006.01)
*H02P 29/024* (2016.01)
*H02P 27/08* (2006.01)
*H02P 29/028* (2016.01)

(52) U.S. Cl.
CPC ............ *H02P 27/08* (2013.01); *H02P 29/028* (2013.01); *H02P 29/0243* (2016.02)

(58) Field of Classification Search
CPC ..... H02M 2007/53876; H02M 7/5387; H02M 7/53871; H02M 7/53873; H02P 21/26; H02P 27/08; H02P 29/0241; H02P 6/18; H02P 21/18
USPC .... 318/400.14, 400.26, 400.21, 400.22, 490, 318/478
See application file for complete search history.

(56) References Cited

U.S. PATENT DOCUMENTS

| | | | | |
|---|---|---|---|---|
| 7,986,121 B2 * | 7/2011 | Hayashi | ............... | H02P 21/18 318/434 |
| 8,384,336 B2 * | 2/2013 | Gunji | ............... | H02M 1/32 318/400.26 |
| 8,890,450 B2 * | 11/2014 | Maekawa | ............... | H02P 6/18 318/400.02 |
| 2005/0017671 A1 * | 1/2005 | Tobari | ............... | H02P 6/085 318/802 |
| 2008/0265829 A1 * | 10/2008 | Hayashi | ............... | H02P 21/18 318/781 |
| 2010/0117574 A1 * | 5/2010 | Gunji | ............... | H02M 1/32 318/400.14 |
| 2012/0074888 A1 * | 3/2012 | Maekawa | ............... | H02P 6/18 318/400.36 |
| 2012/0163046 A1 * | 6/2012 | Hibino | ............... | H02P 27/08 363/37 |
| 2013/0069572 A1 * | 3/2013 | Maekawa | ............... | H02P 21/26 318/400.14 |
| 2014/0077741 A1 * | 3/2014 | Kumagai | ............... | H02P 23/00 318/490 |
| 2014/0156144 A1 * | 6/2014 | Hoshi | ............... | B62D 5/0463 701/41 |
| 2014/0368147 A1 * | 12/2014 | Barrenscheen | ............... | H02H 3/083 318/490 |
| 2015/0008860 A1 * | 1/2015 | Lee | ............... | H02M 7/53871 318/503 |
| 2015/0145448 A1 * | 5/2015 | Mukai | ............... | H02P 6/12 318/400.21 |
| 2015/0145449 A1 * | 5/2015 | Mukai | ............... | H02M 1/32 318/400.22 |

FOREIGN PATENT DOCUMENTS

| | | |
|---|---|---|
| JP | 2007-112416 A | 5/2007 |
| JP | 2007-118858 A | 5/2007 |
| JP | 2009-001055 A | 1/2009 |
| JP | 2009-131064 A | 6/2009 |
| JP | 2010-068672 A | 3/2010 |
| JP | 2010-074868 A | 4/2010 |
| JP | 2012-218658 A | 11/2012 |
| JP | 2013-110864 A | 6/2013 |
| WO | 2013/077241 A1 | 5/2013 |

* cited by examiner

PRIOR ART

PRIOR ART

US 9,862,409 B2

ELECTRIC POWER STEERING APPARATUS

TECHNICAL FIELD

The present invention relates to an electric power steering apparatus that PWM-controls a 3-phase motor by means of an inverter based on a current command value and assist-controls a steering system of a vehicle by feed-backing detected currents of the 3-phase motor, and in particular to the electric power steering apparatus with a high reliability that has a 3-shunt control function to perform a 3-shunt PWM-control with a 3-phase detected current values based on down-stream 3-shunt of the inverter; a 1-shunt PWM-control function to perform a 1-shunt PWM-control with the 3-phase detected current values based on down-stream 1-shunt; and a switching function to switch from the 3-shunt control function to the 1-shunt control function when a failure of current detection circuit systems is detected.

BACKGROUND ART

An electric power steering apparatus that energizes a steering mechanism of a vehicle by using a rotational torque of a motor as a steering assist force (assist torque), applies a driving force of the motor as the steering assist force to a steering shaft or a rack shaft by means of a transmission mechanism such as gears or a belt through a reduction mechanism. In order to accurately generate the assist torque, such a conventional electric power steering apparatus (EPS) performs a feedback control of a motor current. The feedback control adjusts a voltage supplied to the motor so that a difference between a current command value and the motor current becomes small, and the adjustment of the voltage applied to the motor is generally performed by an adjustment of a duty ratio of a pulse width modulation (PWM) control.

A general configuration of a conventional electric power steering apparatus will be described with reference to FIG. 1. As shown in FIG. 1, a column shaft (a steering shaft, handle shaft) 2 connected to a steering wheel (handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command based on a steering torque Th detected by the torque sensor 10 and a vehicle speed Vel detected by a vehicle speed sensor 12, and controls a current supplied to the motor 20 based on a voltage command value Vref obtained by performing compensation and so on with respect to the current command value in a current control section. A steering angle sensor 14 is necessarily needed, and it may not be provided.

A controller area network (CAN) to send/receive various information and signals on the vehicle is connected to the control unit 30, and it is also possible to receive the vehicle speed Vel from the CAN. Further, a Non-CAN 51 is also possible to connect to the control unit 30, and the Non-CAN 51 sends and receives a communication, analogue/digital signals, electric wave or the like except for the CAN 50.

The control unit 30 mainly comprises an MCU (including a CPU or the like), and general functions performed by programs within the MCU are shown in FIG. 2.

Functions and operations of the control unit 30 will be described with reference to FIG. 2. As shown in FIG. 2, the steering torque Th detected by the torque sensor 10 and the vehicle speed Vel detected by the vehicle speed sensor 12 (or from CAN 50) are inputted into a current command value calculating section 31 to calculate a current command value Iref1. The current command value calculating section 31 calculates the current command value Iref1 which is a current desired-value of the current supplied to the motor 20 based on the steering torque Th and the vehicle speed Vel and by means of an assist map and so on. The current command value Iref1 is inputted into a current limiting section 33 via an addition section 32A, and a current command value Irefm of which the maximum is limited is inputted into a subtraction section 32B. A deviation I (=Irefm−Im) between the current command value Irefm and a motor current value Im that is fed back, is calculated at the subtraction section 32B. The deviation I is inputted into a PI-control section 35 for improving the characteristic of the steering operation. The voltage command value Vref that characteristic improvement is performed in the PI-control section 35, is inputted into a PWM-control section 36. Furthermore, the motor 20 is PWM-driven through an inverter 37 serving as a drive section. The current value Im of the motor 20 is detected by a motor current detector 38 and is fed back to the subtraction section 32B. In general, the inverter 37 uses EFTs as driving elements and is comprised of a bridge circuit of FETs.

Further, a compensation signal CM from a compensation section 34 is added to the addition section 32A, and the compensation of the system is performed by the addition of the compensation signal CM so as to improve a convergence, an inertia characteristic and so on. The compensation section 34 adds a self-aligning torque (SAT) 343 and an inertia 342 to an addition section 344, further adds the result of addition performed to the addition section 344 and a convergence 341 in an addition section 345, and then outputs the result of addition performed in the addition section 345 as the compensation signal CM.

In a case that the motor 20 is a 3-phase brushless motor, details of the PWM-control section 36 and the inverter 37 is a configuration such as shown in FIG. 3. That is, the PWM-control section 36 comprises a duty calculating section 36A that calculates, in synchronism with a PWM-carrier, PWM-duty command values D1 to D6 of 3-phases according to a predetermined expression based on the voltage command value Vref and a gate driving section 36B that drives each gate of FETs with the PWM-duty command values D1 to D6 and switches ON/OFF after dead time compensations. The inverter 37 comprises a three-phase bridge having upper and lower arms comprised of the upper FET1 and the lower FET4 of U-phase, upper and lower arms comprised of the upper FET2 and the lower FET5 of V-phase, and upper and lower arms comprised of the upper FET3 and the lower FET6 of W-phase, and drives the motor 20 by being switched ON/OFF based on the PWM-duty command values D1 to D6.

In these electric power steering apparatus, it is necessary to detect each phase current of the motor 20 and to feedback them, and as one of request items for a compact unit, lighting and cost down, unitizing (1-shunt type current detection circuit) of the current detection circuit is proposed. The 1-shunt type current detection circuit is known as the unitizing of the current detection circuit, for example, it is disclosed in Japanese Published Unexamined Patent Application No. 2009-131064 A (Patent Document 1) and WO 2013/077241 (Patent Document 2).

On the other hand, in the electric power steering apparatus, there are also vehicle types which are desired a multiplex system in order to raise a reliability of the apparatus as well as for the purpose of fail-safe and a stability even if the cost-up rises. This is the same with the current detection system to detect each phase current of the motor.

THE LIST OF PRIOR ART DOCUMENTS

Patent Documents

Patent Document 1: Japanese Published Unexamined Patent Application No. 2009-131064 A
Patent Document 2: WO 2013/077241
Patent Document 3: Japanese Published Unexamined Patent Application No. 2007-112416 A

SUMMARY OF THE INVENTION

Problems to be Solved by the Invention

The apparatuses disclosed in Patent Documents 1 and 2 can accurately detect each phase currents for each control periods by using a single current detection means having shunt resistances between the bottom of the FET bridge and the earth (GND). However, neither has each arm current detectors, and there is a problem not to be able to correspond for the multiplex system being desired the reliability and the stability. Further, Japanese Published Unexamined Patent Application No. 2007-112416 A (Patent Document 3) also discloses a steering apparatus to detect 3-phase motor currents by means of a single current sensor. However, the steering apparatus disclosed in Patent Document 3 does not also have each arm current detectors and always carries on 1-shunt current control.

Further, in the case of the 3-shunt current detection system, although a failure detection means due to the 3-phase sum of the detected currents is generally used, it is impossible to judge which phase is failure. Accordingly, in the case of the electric power steering apparatus, the operations such as the stop of the assist control are dealt when the failure is detected and there has been a problem to load to the driver.

The present invention has been developed in view of the above-described circumstances, and an object of the present invention is to provide an electric power steering apparatus that has a 3-shunt control function to perform a 3-shunt PWM-control for raising a reliability of the apparatus and for improving a stability, and a 1-shunt control function to perform a 1-shunt PWM-control so as to continue an assist control when the 3-shunt control function is damaged or failed.

Means for Solving the Problems

The present invention relates to, the above-described object of the present invention is achieved by an electric power steering apparatus that calculates a current command value based on at least a steering torque, PWM-controls a 3-phase motor with an inverter based on said current command value, detects currents of said 3-phase motor, feedbacks said detected 3-phase motor currents, and assist-controls a steering system of a vehicle, having: a 3-shunt control function to perform a 3-shunt PWM-control with a first 3-phase detected current values based on down-stream 3-shunt of said inverter; a 1-shunt control function to perform a 1-shunt PWM-control with a second 3-phase detected current values based on down-stream 1-shunt of said inverter; and a switching function to switch from said 3-shunt control function to said 1-shunt function when a failure of current detection circuit system in relation to said first 3-phase detected current values is detected.

Further, the above-described object of the present invention is more effectively achieved by that wherein further including a first judging section to compare said first 3-phase detected current values with said second 3-phase detected current values and to judge a presence of a failure phase when said function is switched from said 3-shunt control function to said 1-shunt control function; or wherein said switching function switches from said 1-shunt control function to said 3-shunt control function when said first judging section judges that there is no failure phase; or wherein further including a second judging section to judge number of failure phases when said first judging section judges that there is a failure phase; or wherein said assist control is stopped when said second judging section judges that said number of said failure phases is two or more; or wherein normality of said 1-shunt current detection system is confirmed and said 1-shunt control function is continued when said second judging section judges that said number of said failure phases is one.

Effects of the Invention

An electric power steering apparatus according to the present invention has a 3-shunt control function to perform a 3-shunt PWM-control with a 3-phase detected current values based on down-stream 3-shunt of an inverter, a 1-shunt control function to perform a 1-shunt PWM-control with a 3-phase detected current values based on down-stream 1-shunt of the inverter, and switches from the 3-shunt control function to the 1-shunt function when a failure (including abnormality) of current detection circuit system of 3-phase current is detected. Therefore, in spite of becoming a cost up, it is possible to raise a reliability of the apparatus and obtain a stability as the effects beyond the demerit and the continuation function of the assist control is also superior.

Further, in the case of the electric power steering apparatus, when the failure (including abnormality) is detected, the assist control is stopped or the assist control is continued by switching from the feedback control to the open loop control. Consequently, the load of the steering operation of the driver is not lightened, or the uncomfortable feeling is often given to the driver. However, according to the electric power steering apparatus of the present invention, it has an advantage being possible to continuously enable the steering assist with a high reliability even if the failure of the current detection circuit system is detected.

BRIEF DESCRIPTION OF THE DRAWINGS

In the accompanying drawings.

MODE FOR CARRYING OUT THE INVENTION

The present invention is an electric power steering apparatus that has a 3-shunt control function to perform a 3-shunt PWM-control for raising a reliability of the apparatus and for improving a stability, and has a 1-shunt control function to perform a 1-shunt PWM-control so as to continue an assist control when the 3-shunt control function is damaged or failed. The above two functions are switched with predetermined conditions so as to realize a steering performance with the high reliability by harmonizing the features of the 3-shunt control function and the 1-shunt control function.

For raising the reliability of the current detection, the present invention possesses a 1-shunt resistance between the bottom of the inverter and the earth (GND) in addition to the 3-shunt resistances of the lower stage of the FET bridge so as to obtain a constitution being possible to detect a synthesized current of the FET bridge. In a case that "all the current detection circuit systems are normal" is judged by the above constitution, the 3-phase PWM-control is performed in accordance with the detected currents of the respective arm current detection circuits. Since the sum of the detected currents of the arm current detection circuits roughly indicates adjacent "0", the failure diagnosis of the arm current detection circuits is judges by comparing the current sum with a predetermined threshold in the present invention. In a case that "any one of the current detection circuit systems of arm currents (3-phase currents) is failure" is judged, the assist control (motor driving control) is continued by switching from the 3-shunt PWM-control to the 1-shunt PWM-control and by performing the current control based on the detected currents with the 1-shunt resistance connected between the bottom of the inverter and the earth (GND). Further, in a case that the current detection circuit becomes failure, it is possible to continue the assist control by switching to the 1-shunt PWM-control.

Furthermore, after switching to the 1-shunt PWM-control, the respective arm current values detected by the 1-shunt current detection system are compared with the detected current values actually detected by the arm current detection circuits, and a failure arm current detection circuit is judged. After the judgment of the failure arm current detection circuit, it is possible to continue the assist control (motor driving control) with a high reliability by comparing the current values of the respective arms due to the 1-shunt current detection system with the normal detected arm current values.

Hereinafter, embodiments of the pre sent invention will be described with reference to the accompanying drawings.

Figure 4:
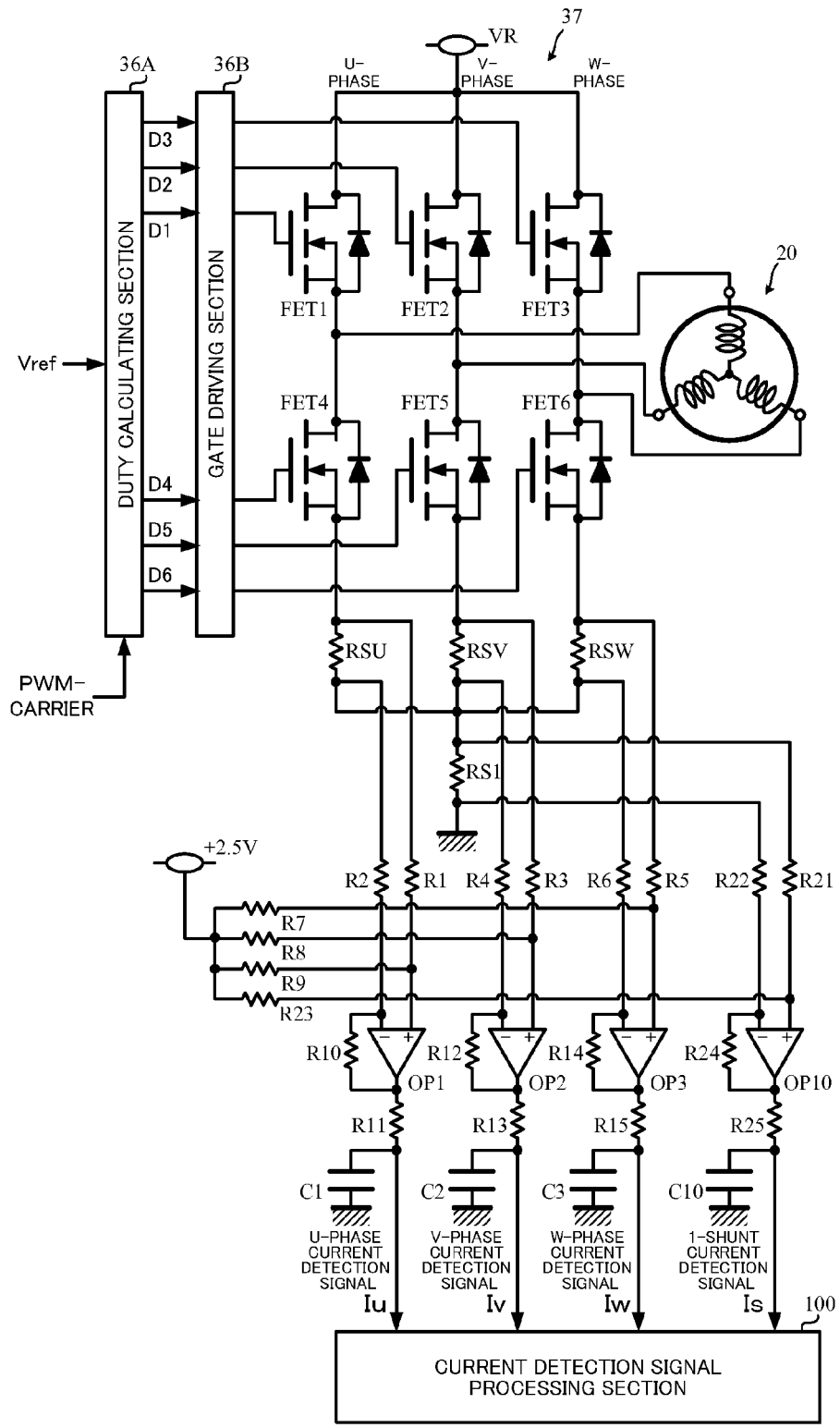
FIG. 4 is a block diagram showing a configuration example of the present invention.

The present invention comprises 3-phase current detection circuits and a 1-phase current detection circuit as shown in FIG. 4. The 3-phase current detection circuits respectively have 3-shunt resistances RSU, RSV, RSW being connected to arm lower stages of the inverter 37 and respectively amplify voltage differences (fall voltages) of both terminals of the shunt resistances being generated by the currents flowing in the 3-shunt resistances RSU, RSV, RSW. The 1-phase current detection circuit has a 1-shunt resistance RS1 being connected between the bottom of the inverter 37 and the earth (GND) and amplifies a voltage difference (fall voltage) of the shunt resistance being generated by the current flowing in the 1-shunt resistance RS1. Either of detected current signals of the 3-phase current detection circuits and the 1-phase current detection circuit is inputted into a current detection signal processing section 100 via an input section 111.

Figure 1:
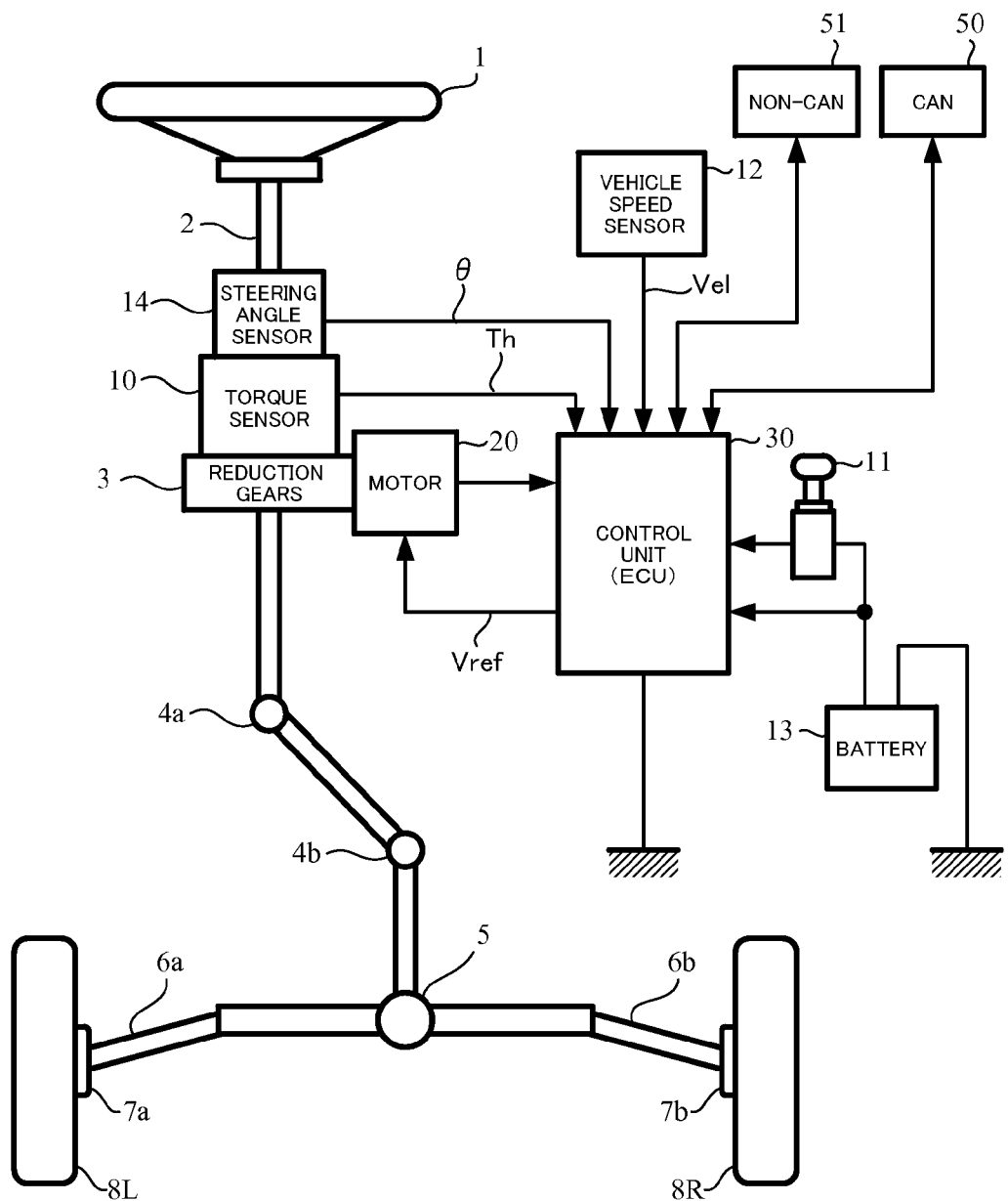
FIG. 1 is a diagram illustrating a configuration example of a general electric power steering apparatus.
Figure 2:
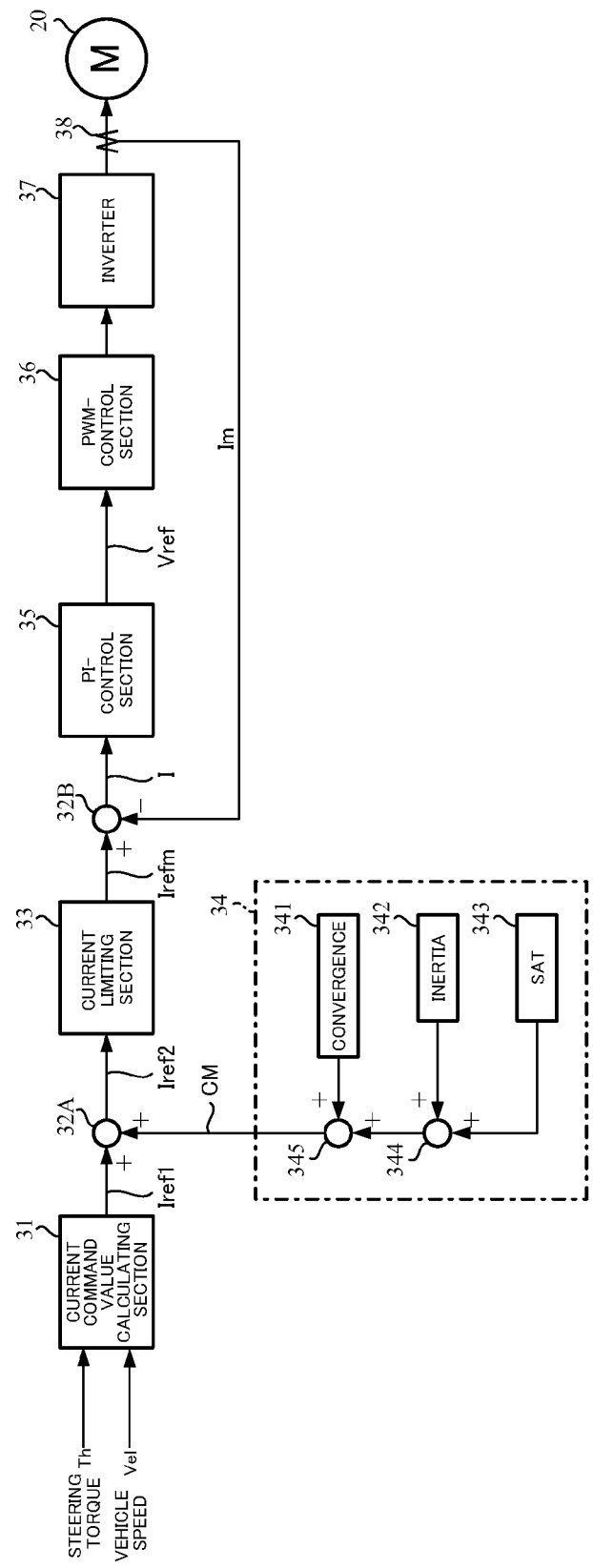
FIG. 2 is a block diagram showing an example of a control unit of the electric power steering apparatus.
Figure 3:
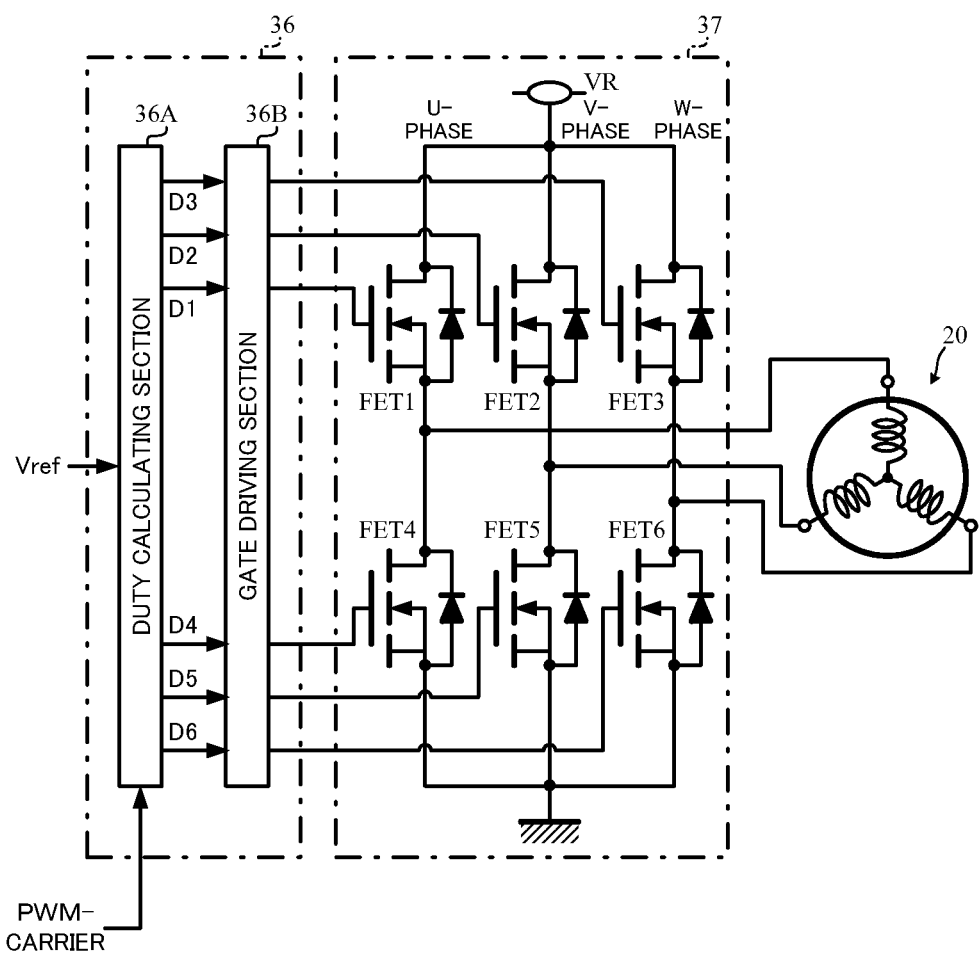
FIG. 3 is a block diagram showing a configuration example of a PWM-control section and an inverter.

FIG. 4 shows a configuration example of the present invention in correspondence with FIG. 3, 3-phase shunt resistances RSU, RSV, RSW are respectively connected to 3-phase down-streams of the inverter 37, and current detection circuits are respectively connected to the shunt resistances RSU, RSV, RSW. Further, a shunt resistance RS1 of 1-shunt is provided between an earth side connection point (the bottom of the inverter 37) and the earth (GND). A current detection circuit is also connected to the shunt resistance RS1.

Operational amplifiers (differential amplifiers) OP1, OP2, OP3 to respectively detect fall voltages falling due to the flowing current and to convert the voltages to the current values are connected to respective both ends of the shunt resistances RSU, RSV, RSW via input resistances R1-R2, R3-R4, R5-R6. Further, feedback resistances R10, R11, R12 are respectively connected to the operational amplifiers OP1, OP2, OP3, and balancing resistances R7, R8, R9 being connected to power source (+2.5V) are respectively connected to input terminals of the operational amplifiers OP1, OP2, OP3. Currents Iu, Iv, Iw flowing in the shunt resistances RSU, RSV, RSW are detected by calculating-operation due to the operational amplifiers OP1, OP2, OP3 and the connected resistances.

Furthermore, an operational amplifier (differential amplifier) OP10 to detect a fall voltage falling due to the flowing current and to convert the voltage to the current value is connected to both ends of the shun resistance RS1 via input resistances R21 and R22, and a feedback resistance R24 is connected to the operational amplifier OP10. A balancing resistance R23 being connected to the power source (+2.5V) is connected to input terminals of the operational amplifier OP10. A current flowing in the shunt resistance RS1 is detected by calculating-operation due to the operational amplifier OP10 and the connected resistances.

Low pass filters (LPFs) comprising a resistance R11 and a capacitor C1, a resistance R13 and a capacitor C2, a resistance R15 and a capacitor C3, a resistance R25 and a capacitor C10 are respectively provided at output sections of the current detection circuits. Current detection signals Iu, Iv, Iw and Is outputted from the respective current detection circuits are inputted into a current detection signal processing section 100 via the respective LPFs and the input section 111. The current detection signals Iu, Iv, Iw and Is of which noises are removed are inputted into the current detection signal processing section 100.

Figure 5:
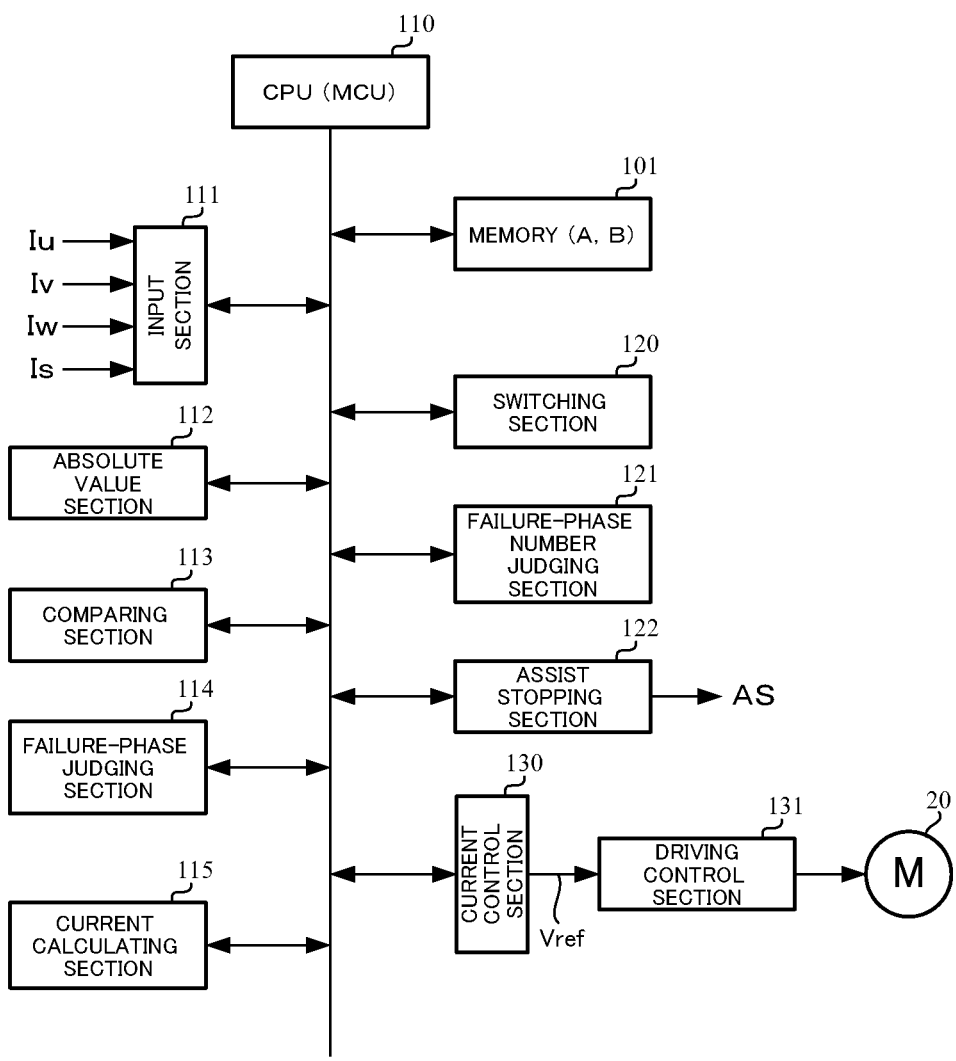
FIG. 5 is a block diagram showing an example of configuration of a current detection signal processing section according to the present invention.

The current detection signal processing section 100 has a configuration (functions) as shown in FIG. 5, and a central processing unit (CPU or MCU) 110 to control the whole is provided. To the CPU 110, an input section 111 to input (including A/D) the currents Iu, Iv, Iw flowing in the 3-shunt resistances RSU, RSV, RSW and the current Is flowing in the 1-shunt resistance RS1, an absolute value section 112 to obtain absolute values such as a total sum value of the currents Iu, Iv, Iw, a comparing section 113 to perform a comparison explaining hereinafter, a failure-phase judging section 114 to detect a failure (including a damage or an abnormality) of the motor phase and current detection system, and a current calculating section 115 to calculate 3-phase currents Iu', Iv', Iw' based on the current Is flowing in the 1-shunt resistance RS1 are mutually connected.

Further, to the CPU 110, a memory 101 to store parameters such as thresholds A and B described hereinafter and to have a memorizing function which is necessary for the calculation and process, a switching section 120 to switch the 3-shunt control function and the 1-shunt control function, a failure-phase number judging section 121 to detect a failure-phase number when the failure is detected, an assist stopping section 122 to perform the process for stopping the assist control, and a current control section 130 to drive-control the motor 20 through a driving control section 131 such as the PI-control section, the PWM-control, the inverter and so on are mutually connected.

Figure 6:
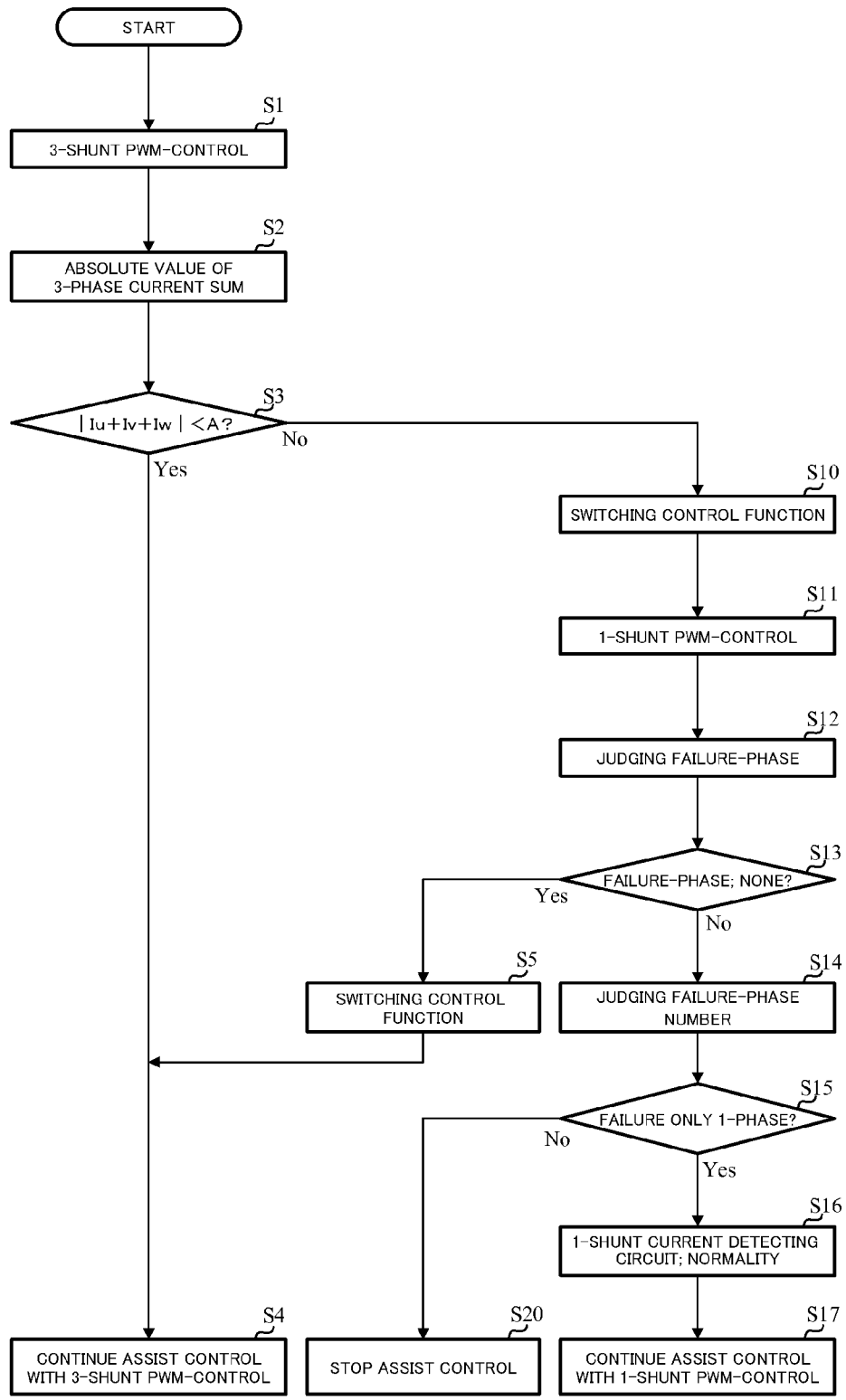
FIG. 6 is a flow chart showing an operation example of the present invention.

In such a configuration, the operational example will be described with reference to a flowchart of FIG. 6.

Although the present invention has the 3-shunt control function to perform the 3-shunt PWM-control by means of the 3-phase current detection values Iu, Iv, Iw based on the down-stream 3-shunt (shunt resistances RSU, RSV, RSW) of the inverter 37 and the 1-shunt control function to perform the 1-shunt PWM-control by means of the 3-phase current detection values based on the down-stream 1-shunt (shunt resistances RS1) of the inverter 37, the 3-shunt PWM-control of the 3-shunt control function is ordinarily enabled. When the inverter 37 is driven by means of the 3-shunt PWM-control (Step S1), a current flows in the shunt resistances RSU, RSV, RSW being connected to the down-stream of the inverter 37. Therefore, the current detection signals Iu, Iv, Iw are detected by the respective current detection circuits and then they are inputted into the current detection signal processing section 100 via the input section 111. The absolute value section 112 in the current detection signal processing section 100 obtains an absolute sum value |Iu+Iv+Iw| of the inputted current detection signals Iu, Iv, Iw for the purpose of the failure of the detection of the 3-phase current detection circuits (Step S2).

The comparing section 113 compares the absolute sum value |Iu+Iv+Iw| obtained in the absolute value section 112 with the threshold value A (≈0) which is in advance stored in the memory 101, and judges whether |Iu+Iv+Iw|<A or not (Step S3). Although the absolute sum value |Iu+Iv+Iw| ordinarily indicates vicinity of zero and does not exceed the threshold A, it does not indicate the vicinity of zero when the failure is judged and the absolute sum value |Iu+Iv+Iw| exceeds the threshold A. Accordingly, the comparing section 113 judges an existence of the failure by means of the following expression 1.
(Expression 1)
In a case of |Iu+Iv+Iw|<A, it is the normality.
In a case of |Iu+Iv+Iw|≥A, it is the failure.

In a case that the normality is judged, the 3-shunt PWM-control is continued, the current control is performed based on the current detection signals Iu, Iv, Iw detected with the shunt resistances RSU, RSV, RSW and the assist control is continued.

Further, in a case that "|Iu+Iv+Iw|≥A" is established and the failure is judged in the comparing section 113, the control function is switched through the switching section 120 (Step S10) and the function is switched from the 3-shunt PWM-control of the 3-shunt control function to the 1-shunt PWM-control of the 1-shunt control function (Step S11). During the 1-shunt PWM-control, the current detection signal Is detected in the current detection circuit with the shunt resistance RS1 is inputted into the current detection signal processing section 100 via the input section 110 and the 3-phase currents Iu', Iv', Iw' are detected by means of the method (2-phase detection/1-phase estimation system, saw-tooth waveform in PWM mode) disclosed in the document such as Japanese Published Unexamined Patent Application No. 2009-131064 A (Patent Document 1) and WO 2013/077241 (Patent Document 2).

After of switching to the 1-shunt PWM-control, the failure-phase judging section 114 judges an arm current detection circuit indicating the failure (Step S12). That is, first, the absolute value section 112 obtains the absolute values of the respective differences between the current detection signals Iu', Iv', Iw' detected by the 1-shunt current detection system and the current detection signals Iu, Iv, Iw detected by the 3-shunt current detection system. Next, the failure-phase judging section 114 compares these absolute values with the threshold B previously stored in the memory 101 and then judges whether it is the normality or the failure. The normality judging conditions are the following expression 2 and the failure judging conditions are the following expression 3.
(Expression 2)
If |Iu−Iu'|<B, then the U-phase arm current detection system is the normality.
If |Iv−Iv'|<B, then the V-phase arm current detection system is the normality.
If |Iw−Iw'|<B, then the W-phase arm current detection system is the normality.
(Expression 3)
If |Iu−Iu'|≥B, then the U-phase arm current detection system is the failure.
If |Iv−Iv'|≥B, then the V-phase arm current detection system is the failure.
If |Iw−Iw'|≥B, then the W-phase arm current detection system is the failure.

In a case of judging that there is no failure-phase based on the above expressions 2 and 3 (Step S13), the switching section 120 switches the control function (Step S5) and the function is switched from the 1-shunt PWM-control of the 1-shunt control function to the 3-shunt PWM-control of the 3-shunt control function. That is, the control function is changed to the ordinal 3-phase PWM-control, the current control is performed based on the current detection signals Iu, Iv, Iw and the assist control is performed.

Here, in a case of judging that there is a failure-phase at the above Step S13, the failure-phase number judging section 121 judges number of the failure-phase (Step S14). In a case that only one phase is a failure, it is possible to detect the currents of another two phases (Step S16) and the assist control is continued by means of the current detection system of the 1-shunt PWM-control (Step S17). Further, in a case that the failure-phase number is two or more, since it is impossible to detect the currents, the assist control is stopped (Step S20).

In a case that the assist control is continued by means of the current detection system of the 1-shunt PWM-control, a current detected by the arm current detection circuit that is judged as the normality for the purpose of the failure judgment of the 1-shunt current detection circuit, is periodically compared. In a case that the U-phase current detection signal Iu and the V-phase current detection signal Iv are judged as the normality, the current values Iu' and Iv' obtained by means of the 1-shunt current detection system, are periodically compared. Consequently, it is possible to instantaneously judge that anyone of the 1-shunt current detection circuit, the arm current detection circuits of the U-phase and the V-phase becomes to the failure and further to continue the assist control with holding the reliability.

Moreover, in a current detection system of the downstream 3-shunt, it is necessary to detect at least two phases with simultaneous samplings at a timing when Low-side FETs are "ON". If it is possible to detect the currents of the two phases, it is possible to detect the current of the remaining one phase according to the relation of "Iu+Iv+Iw=0". Further, in a case of a duty saturation time (ON time of Low-side FET is smallest), there is a possibility to become impossible to detect the phase current since the current does not flow in the shunt resistance of the Low-side. Therefore, in view of the detection characteristic of the duty saturation time, it is necessary to detect at least the currents of two phases of which duties are not saturate by judging the phase of which duty is saturate varying during the motor rotation.

EXPLANATION OF REFERENCE NUMERALS 1 steering wheel (handle)
2 column shaft (steering shaft, handle shaft)
10 torque sensor
12 vehicle speed sensor
14 steering angle sensor
20 motor
30 control unit (ECU)
31 current command value calculating section
33 current limiting section
34 compensation signal generating section
35 PI-control section
36 PWM-control section
37 inverter
50 CAN
100 current detection signal processing section
101 memory
110 CPU (MCU)
111 input section
112 absolute value section
113 comparing section
114 failure-phase judging section
115 current calculating section
120 switching section
121 failure-phase number judging section
122 assist stopping section
130 current control section
131 driving control section

The invention claimed is:

1. An electric power steering apparatus that calculates a current command value based on at least a steering torque, PWM-controls a 3-phase motor with an inverter comprising a bridge circuit having 3-phase upper and lower stages based on said current command value, detects currents of said 3-phase motor, feedbacks said detected 3-phase motor currents, and assist-controls a steering system of a vehicle, having:
 a 3-phase current detection circuit detecting 3-phase currents based on 3-shunt resistance connected to each ground side of 3-phase lower stage FET of said bridge circuit,
 a 1-phase current detection circuit detecting a 3-phase current sum based on 1-shunt resistance connected to between a connecting point of said 3-phase shunt resistance and ground, and
 a current detection signal processing section processing by inputting each of current detection signals of said 3-phase current circuit and said 1-phase current detection circuit, wherein said current detection signal processing section comprises:
  a comparing section comparing a threshold value with an absolute value of said 3-phase current sum,
  a switching section switching said 3-shunt PWM-control and said 1-shunt PWM-control based on the result of said comparing section,
  an abnormal phase detecting section detecting an abnormality of a motor-phase and a current detection system, and
  an assist stop section stopping said assist-controls.

2. The electric power steering apparatus according to claim 1, wherein said comparing section judges that an abnormality occurs when an absolute value of said 3-phase current sum takes more than said threshold value and said switching section switches from said 3-shunt PWM-control to said 1-shunt PW-control.

3. The electric power steering apparatus according to claim 2, wherein said switching section switches from said 1-shunt PWM-control to said 3-shunt PWM-control when said abnormal phase judging section judges that there is no failure phase in said 1-shunt PWM-control.

4. The electric power steering apparatus according to claim 3, further including an abnormal phase number judging section to judge number of failure phases when said abnormal phase judging section judges that there is a failure phase.

5. The electric power steering apparatus according to claim 4, wherein said assist stop section stops said assist control when said abnormal phase number judging section judges that said number of said failure phases is two or more.

6. The electric power steering apparatus according to claim 4, wherein normality of said 1-phase current detection circuit system is confirmed and said 1-shunt PWM-control is continued when said abnormal phase number judging section judges that said number of said failure phases is one.

* * * * *